US005332885A

United States Patent [19]

Landes

[11] Patent Number: 5,332,885

[45] Date of Patent: Jul. 26, 1994

[54] PLASMA SPRAY APPARATUS FOR SPRAYING POWDERY OR GASEOUS MATERIAL

[76] Inventor: Klaus Landes, Melchiorstrasse 23, D-8000 München 71, Fed. Rep. of Germany

[21] Appl. No.: 836,037

[22] Filed: Feb. 12, 1992

[30] Foreign Application Priority Data

Feb. 21, 1991 [DE] Fed. Rep. of Germany ....... 4105407

[51] Int. Cl.5 ................................................ B23K 9/00

[52] U.S. Cl. .......................... 219/121.47; 219/121.52; 219/121.51; 219/76.16

[58] Field of Search ...................... 219/121.47, 121.59, 219/121.48, 121.51, 121.5, 75, 76.16; 427/34

[56] References Cited

U.S. PATENT DOCUMENTS

| | | | |
|---|---|---|---|
| 3,866,089 | 2/1975 | Hengartner | 219/121.5 |
| 4,521,666 | 6/1985 | Severance, Jr. et al. | 219/121.59 |
| 4,639,570 | 1/1987 | Zverina | 219/121.5 |
| 4,725,447 | 2/1988 | Pfender | 219/121.4 Z |

*Primary Examiner*—Mark H. Paschall

[57] ABSTRACT

The invention provides a plasma spray apparatus for spraying powdery or gaseous material. The apparatus comprises an indirect plasmatron for creating an elongated plasma torch. The powdery or gaseous material is axially fed into the plasma torch. The plasmatron comprises a cathode assembly, an annular anode member located distantly from the cathode assembly and a plasma channel extending from the cathode assembly to the anode member and having a zone with a reduced diameter located in the region of the plasma torch which is near to the cathode assembly. The plasma channel is delimited by the annular anode member as well as by a plurality of annular neutrode members which are electrically insulated from each other.

The cathode assembly comprises a central insulating member arranged in a fixed position with regard to the plasma channel inlet nozzle and further comprises a plurality of cathode elements embedded in the insulating member.

21 Claims, 4 Drawing Sheets

2
2
2
KW
KW
KW
PG
SM
TG
1
1
3
4
5
6
7
8
9
10
11
12
13
14
15
16
17
18
19
20
21
22
23
24
25
26
27
28
29
30
31
32
33
34
35
36
37
38
39
40
41
42
43
44
45
46
47
51
52
63

PLASMA SPRAY APPARATUS FOR SPRAYING POWDERY OR GASEOUS MATERIAL

BACKGROUND OF THE INVENTION

1. Field of the Invention

The present invention relates to a plasma spray apparatus for spraying powdery or gaseous material, comprising an indirect plasmatron for creating an elongated plasma torch and means for axially feeding the powdery or gaseous material into the plasma torch. Such a plasmatron comprises a cathode assembly, an annular anode member located distantly from the cathode assembly and a plasma channel extending from the cathode assembly to the anode member.

The plasma channel is delimited by the annular anode member as well as by a plurality of annular neutrode members which are electrically insulated from each other.

For spraying e.g. powdery material in a molten state onto a substrate surface, such plasma spray apparatusses are well known in the art which make use of an indirect plasmatron, i.e. an apparatus for creating a plasma with a plasma torch escaping from a nozzle-like element which plasma torch is electrically not current conductive. Usually, the plasma is created by means of a torch and guided through a plasma channel to an outlet nozzle. Thereby, an important difference exists between an apparatus with a short plasma torch and an apparatus with an elongated plasma torch.

2. Prior Art

In a major portion of all plasma spray apparatusses which are commercially used in these days, the plasma torch is created by means of a high current arc discharge between a pin-shaped cathode member and a hollow cylinder anode member. Thereby, the coating material which has to be molten and axially accelerated, e.g. powdery material like metallic or ceramic powder, is introduced into the plasma torch from the side in the region of the anode member which simultaneously forms the outlet opening of the outlet nozzle. Such proceeding of powder feeding, however, is not advantageous as the powder particles are subjected to a different treatment in the plasma torch, depending on their size and on the velocity with which they are introduced into the plasma torch. For instance, big powder particles pass the plasma torch and are not molten. The result is that the coating material is not fully used for coating a substrate surface and that the quality of the surface to be coated is of inferior quality. Furthermore, the complex relations between the operating parameters render the optimization of the plasma spray process much more complicate. Mainly the disturbance of the plasma torch by the radially fed carrier gas which is necessary for feeding the coating powder into the plasma torch is very disadvantageous.

The European Patent Application Nr. 0 249 238 discloses a plasma generating system in which the supply of the material to be sprayed onto the surface of a substrate is accomplished in axial direction. Particularly, there is provided a tube which enters the apparatus in radial direction through the side wall of a nozzle which is positioned in front of the anode, continues to the center of this nozzle and is bent into a direction corresponding to the axis of the nozzle. However, the arrangement of a supply tube in the center of the plasma torch leads to difficulties because the supply tube and the plasma torch influence each other in a disadvantageous manner. This means, on the one hand, that the flow of the plasma torch is hindered by the provision of the supply tube, and, on the other hand, the supply tube situated in the center of the plasma torch is exposed to an extremely high thermal load.

As far as the energy balance is concerned, the plasma spray devices known in the prior art have a very bad efficiency. One important reason is that only that part of the energy is used for melting the coating material which is present at the end of the plasma torch where it merges into the free plasma flow if the coating material is fed into the plasma torch in the region of the anode member. In fact, a major part of the supplied energy is lost within the plasma channel because the walls of the plasma channel are heated by the plasma torch; thus, this energy is lost for melting the coating material.

These facts are especially true for plasmatrons with an elongated plasma torch. According to the already mentioned EP 0 249 238, such a plasmatron comprises an elongate plasma channel extending from a cathode to an anode. The plasma channel is defined by the interior of a plurality of annular neutrodes which are electrically insulated from each other. An elongated plasma torch, in fact, can develop a higher thermal energy than a short plasma torch, is subjected, on the other hand, to more pronounced cooling along its way through the long, relatively narrow plasma channel.

Under these circumstances, the result is that all efforts to obtain an energy concentration in the free plasma which is as high as possible, i.e. in that region of the plasma where the coating material is fed, cannot lead to a substantive improvement of the efficiency due to the reasons discussed hereinabove.

However, some suggestions have been made in the prior art to design plasma spray apparatusses such that their specifications are improved. Particularly, it has been suggested to feed the coating material in the cathode side end of the plasma channel.

The German Utility Model Nr. 1,932,150 discloses a plasma spray apparatus of this kind for spraying powdery material, comprising an indirect plasmatron operating with a short plasma torch. A hollow cathode member cooperates with an anode member which also is of hollow design in the kind of an outlet nozzle. The cathode member and the anode member are coaxially arranged and the cathode member extends into the interior of the annular anode member. The hollow cathode member simultaneously serves as a supply tube for the coating material which, in this manner, is introduced into the space where the plasma torch is created. The plasma gas is fed into the space where the plasma torch is created through an annular gap between the cathode member and the anode member and, therefrom, into the anode member nozzle whereby the plasma torch is narrowed. A major disadvantage of this design is that very high currents have to been used to create the plasma torch and, consequently, the useful operating life of the apparatus is quite low.

Furthermore, it must be mentioned that the mean sojourn time of the coating material escaping from the hollow cathode member in the space where the plasma torch is created is relatively short with the result that the particles of the coating material during its presence in this space can absorb only a small amount of thermal energy, especially because the plasma torch is created initially at the edge of the hollow cathode member and not in the axis in which the coating material is fed. It may be an advantage, under these circumstances, that the powder particles are not completely molten before they escape out of the anode nozzle and, therefore, cannot deposit at the wall of the anode nozzle. However, to completely melt the powder particles and to accelerate them, the paramount portion of energy must be delivered by the free plasma flow which has left the anode nozzle.

The application of a hollow cathode member in a plasmatron with an elongated plasma torch, however, presents pronounced technical difficulties, particularly if the plasmatron is operated at high current levels. The reason is that the plasma torch usually is generated at a locally limited point of the cathode with the result that the related cathode part is thermally overloaded and that the cathode wears out very rapidly. It is possible to electromagnetically rotate the point of origin of the plasma torch to render this effects less severe, or to mechanically adjust the cathode as disclosed in the above mentioned EP 0 249 238 to compensate for wear of the cathode, but both methods are quite complicated and require an increased constructional effort and expense.

OBJECTS OF THE INVENTION

It is an object of the present invention to provide a plasma spray apparatus for spraying powdery or gaseous material which has an improved efficiency.

Particularly, it is an object of the present invention to provide a plasma spray apparatus for spraying powdery or gaseous material which can be operated at lower current levels such that the operating life of the parts of the apparatus which are subject to wear is increased.

It is a still further object of the present invention to provide a plasma spray apparatus for spraying powdery or gaseous material in which the material to be sprayed is better and more uniformly processed to improve the quality of the coating of a substrate.

SUMMARY OF THE INVENTION

In order to achieve these and other subjects, the invention provides a plasma spray apparatus for spraying powdery or gaseous material. The apparatus of the invention comprises an indirect plasmatron for creating an elongated plasma torch and means for axially feeding the powdery or gaseous material into the plasma torch.

The plasmatron comprises a cathode assembly, an annular anode member located distantly from the cathode assembly and a plasma channel extending from the cathode assembly to the anode member whereby the plasma channel is delimited by the annular anode member as well as by a plurality of annular neutrode members which are electrically insulated from each other.

The plasma channel has a zone with a reduced diameter located in that region of the plasma torch which is near to the cathode assembly and thereby forms a plasma channel inlet nozzle. The cathode assembly comprises a central insulating member arranged in a fixed position with regard to the plasma channel inlet nozzle and further comprises a plurality of cathode elements embedded in the insulating member. The cathode elements are located and evenly distributed along the periphery of a circle around a central axis of the apparatus and extending parallel to the central axis.

Each of the cathode elements comprise a cathode pin having an active end on which the plasma torch is created and which extends out of the insulating member into the plasma channel inlet nozzle, and the means for axially feeding the powdery or gaseous material into the plasma torch comprises a supply tube for the supply of powdery or gaseous spray material into the plasma channel inlet nozzle, whereby the supply tube is located coaxially to the central axis of the apparatus and is fixed in the central insulating member.

The cathode assembly of the apparatus according to the invention in an indirect plasmatron operating with an elongated plasma torch, in connection with the zone with reduced diameter established by the plasma channel inlet nozzle, provides for a energy concentration in the region of the plasma channel inlet nozzle which is extraordinarily high. The spray material which is fed through the central supply tube arranged in the longitudinal central axis of the apparatus with the help of a carrier gas penetrates the hottest core of the plasma torch already in a location close to the cathode assembly; thus, the spray material, e.g. the powder particles, are efficiently molten and accelerated. By varying the speed of the flow of the carrier gas, the initial speed of the powder particles and, thereby, the technically important mean sojourn time of the particles in the plasma torch can be adjusted in a simple manner. Consequently, the operating parameters of the plasma spray apparatus according to this invention can be optimally adjusted.

The central insulating member serves not only for the purpose to electrically insulate the cathode members from each other and from the supply tube, but forms, together with the plasma channel inlet nozzle, an annular channel through which the plasma gas enters the plasma channel in a laminar form. An important fact is also that the plasma gas flows along the extension of the cathode members which extend out of the insulating member such that these cathode members are efficiently cooled. This helps to increase the operating life of the cathode members.

In a preferred embodiment, the central insulating member is located very close to the plasma torch and, consequently, is subjected to a very high thermal load, therefore it is made of a material having a high melting temperature, e.g. of ceramics material or boron nitride.

As the cathode elements are also subjected to a high thermal load, each of the cathode elements preferably includes a water-cooled cathode shaft member and a cathode pin fixed to the end portion of the cathode shaft members. The cathode pin can be made of a material having a high melting temperature. Particularly, the cathode shaft member is made of copper and the cathode pin is made of thoriated tungsten.

It is desirable that the cathode pins lie as close together as possible in order to ensure that the plasma torch branches originating from the cathode pins unit as close as possible to the cathode pins. Therefore, each of the cathode pin is eccentrically fixed to its associated cathode shaft such that the longitudinal axes of the cathode pins are closer to the central axis of the apparatus than the longitudinal axes of the cathode shafts.

To ensure a laminar flow of the plasma gas, the jacket surface of the central insulating member is located in radially faced relationship with respect to a part of the wall of the plasma channel inlet nozzle such that the outer surface of the central insulating member and the inner wall of the plasma channel inlet nozzle define an annular channel serving for the inlet of the plasma gas into the plasma channel inlet nozzle.

To further improve the laminar flow behavior of the plasma gas, there is provided a plasma gas distribution means comprising a plurality of nozzle means for achieving an improved laminar flow of the plasma gas into the plasma channel inlet nozzle. According to a first embodiment, the gas distribution means comprises an annular distribution disc mounted on the central insulating member having a plurality of continuous apertures for the passage of plasma gas through the annular channel between the jacket surface of the central insulating member and the part of the wall of said plasma channel inlet nozzle.

According to a second embodiment, the gas distribution means comprises an annular distribution disc mounted in front of the central insulating member, the gas distribution disc extending radially from the supply tube for the supply of coating material up to the wall of the plasma channel inlet nozzle and comprising a plurality of continuous apertures for the passage of plasma gas into the plasma channel inlet nozzle. These apertures are arranged and evenly distributed along the periphery of a circle coaxial with the central longitudinal axis of the apparatus.

Preferably, the annular distribution disc is made of a material having a high melting temperature, e.g. of ceramics material or boron nitride.

According to a third embodiment, the gas distribution means comprises a gas distribution sleeve inserted between the annular chamber between the central insulating member and the wall of the first neutrode member located closest to the cathode assembly. The gas distribution sleeve comprises, on its outer surface, continuous longitudinal grooves for the passage of the plasma gas. The longitudinal grooves have helicoidal shape.

BRIEF DESCRIPTION OF THE DRAWINGS

In the following, preferred embodiments of the apparatus according to the invention will be further described, with reference to the accompanying drawings, in which.

DETAILED DESCRIPTION OF THE PREFERRED EMBODIMENTS

Figure 1:
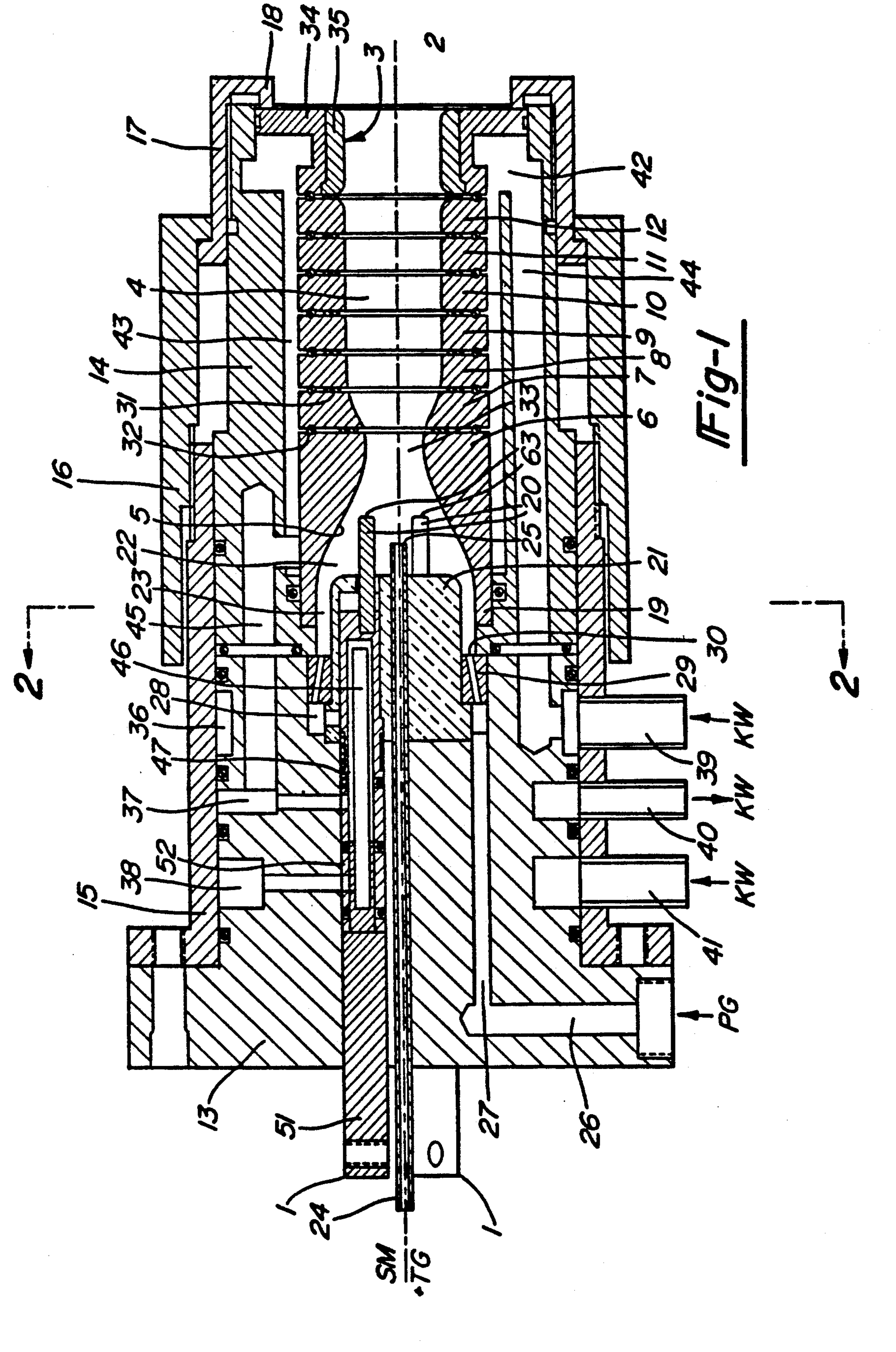
FIG. 1 shows a longitudinal sectional view of a first embodiment of the plasma spray apparatus having three cathode members.
Figure 2:
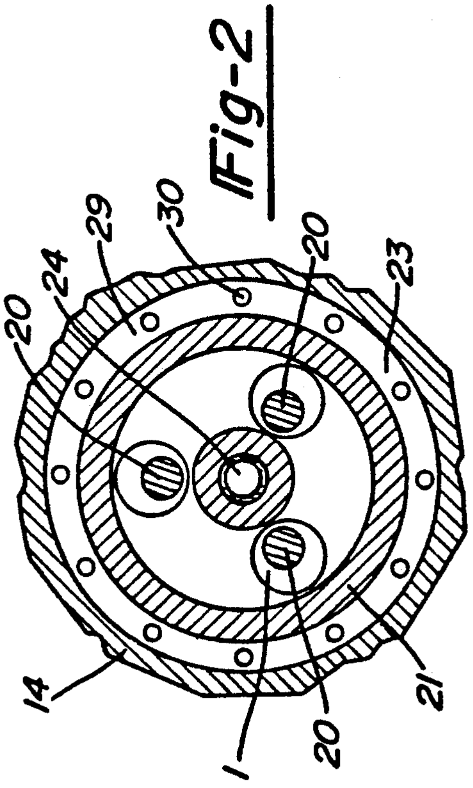
FIG. 2 shows a partial cross sectional view of the cathode member region of the embodiment of FIG. 1 according to the line II—II in FIG. 1, in an enlarged scale.

The plasma spray apparatus shown in FIGS. 1 and 2 comprises three cathode members in the form of longitudinal rod-like cathode assemblies 1 which run parallel to each other and which are arranged on the periphery of a circle around the central longitudinal axis 2 of the apparatus. The arrangement of the cathode assemblies 1 is symmetric with reference to the central longitudinal axis and the cathode assemblies 1 are evenly distributed along the periphery of the circle. Further, the apparatus comprises an annular anode 3 which is located in a certain distance away from the cathode assemblies 1 as well as a plasma channel 4 extending essentially between the ends of the cathode assemblies 1 and the anode 3. The plasma channel 4 is delimited by a plurality of essentially annularly shaped neutrodes 6 to 12 which are electrically insulated with regard to each other as well as by the annular anode 3.

The cathode assemblies 1 each comprise a rod-like cathode member, consisting e.g. of copper, including a first part 51 and a second part 52 which are fixed in a cathode support member 13 consisting of an electrically insulating material, Coaxially thereto arranged, adjacent to one end of the cathode support member 13, is a hollow sleeve-like anode support member 14 made of an electrically insulating material which surrounds the neutrodes 6 to 12 as well as the anode 3. The above described arrangement is fixed together by means of three metal sleeves 15, 16 and 17. The first metal sleeve 15 has a flange on its one side (left in FIG. 1) which is fixed by means of screws (not shown) to an end flange of the cathode support member 13. The other end of the first metal sleeve 15 has an outer screw thread and is screwedly fixed to the one end of the coaxially arranged second metal sleeve 16 which comprises a corresponding inner screw thread. The other end of the second metal sleeve 16 is provided with a flange directed to its interior. The third metal sleeve 17 comprises at its one end (right in FIG. 1) an inner screw thread and is screwed on an outer screw thread provided on the outer surface of the anode support member 14. The other end of the third metal sleeve 17 comprises an outer flange engaging the above mentioned inner flange provided at the (in FIG. 1) right end of the second metal sleeve 16. Thus, after the first metal sleeve 15 has been fixed to the flange of the cathode support member 13 and after the third metal sleeve 17 has been screwed on the anode support member 14, the second metal sleeve 16 can be slid over the third metal sleeve 17 to be screwed onto the first metal sleeve 15, thereby pressing the anode support member 14 against the cathode support member 13.

The third metal sleeve 17 further comprises a flange edge 18 resting against the part 34 of the anode 3. Thereby, the elements forming the plasma channel 4 are held together whereby the neutrode 6 out of the plurality of neutrodes 6 to 12 which is closest to the cathode assemblies 1 rests against an inner recess 19 provided on the anode support member 13.

The cathode assemblies 1 are provided, on its free ends directed towards the plasma channel 4, with cathode pins 20 which consist of a material having an especially good electric and thermal conductivity and, simultaneously, having a high melting temperature, e.g. thoriated tungsten. Thereby, the cathode pins 20 are arranged with reference to the cathode assemblies such that the axis of a cathode pin 20 is not coaxial with the axis of the related cathode assembly 1. This offset is such that the axes of the cathode pins 20 are closer to the central longitudinal axis 2 of the apparatus than the axes of the cathode assemblies 1.

The side of the cathode support 13 facing the plasma channel 4 is provided with a central insulating member 21 made of a material with a very high melting temperature, e.g. glass ceramics material or boron nitride; the insulating member has a fixed position with regard to the first neutrode 6. The insulating member 21 has frontal apertures through which the cathode pins 20 extend into a hollow nozzle chamber 22 which is defined by the interior of the first neutrode 6 located closest to the cathode assemblies 1 and forming the beginning of the plasma channel 4. The freely exposed part of the outer jacket surface of the insulating member 21 radially faces with a certain distance a part of the wall of the plasma channel 4 defined by the interior of the neutrode 6; thereby, an annular chamber 23 is formed which serves for feeding the plasma gas into the hollow nozzle chamber 22 at the beginning of the plasma channel 4.

The supply of the material SM to be sprayed onto a substrate, e.g. metallic or ceramic powder, into the plasma torch is accomplished with the help of a carrier gas TG at that end of the plasma channel 4 which is close to the cathode assemblies 1. For this purpose, there is provided a supply tube 24 extending along the longitudinal axis 2 of the apparatus and fixed in the center of the insulating member 21. The supply tube 24 ends in the hollow nozzle chamber 22 whereby the cathode pins 20 extend farther into the plasma channel 4 than the outlet 25 of the supply tube 24.

The plasma gas PG is fed through a transverse channel 26 provided in the cathode support member 13. The transverse channel 26 merges into a longitudinal channel 27 also provided in the cathode support member 13. Further, the cathode support member 13 is provided with an annular channel 28, and the outlet of the longitudinal channel 27 merges into the annular channel 28. The plasma gas PG, entering the transverse channel 26, flows, through the longitudinal channel 27 into the annular channel 28 and, therefrom, into the annular chamber 23. In order to achieve an optimized laminar flow of the plasma gas PG into the hollow nozzle chamber 22, the insulating member 21 is provided with an annular distribution disc 29 having a plurality of apertures 30 which interconnect the annular channel 28 with the annular chamber 23.

The elements defining the plasma channel 4, i.e. the neutrodes 6 to 12 and the anode 3, are electrically insulated from each other by means of annular discs 31 made of an electrically insulating material, e.g. boron nitride, and gas tightly interconnected to each other by means of sealing rings 32. The plasma channel 4 comprises a zone 33 which is located near to the cathode assemblies 1 and which has a smaller diameter than other zones of the plasma channel 4. Starting from that zone 33 with reduced diameter, the plasma channel increases its diameter towards the anode 3 up to a diameter which is at least 1.5 times the diameter of the plasma channel 4 at its narrowest point, i.e. in the center of the zone 33. According to FIG. 1, after this diameter increase, the plasma channel 4 has cylindrical shape up to its end close to the anode 3.

The neutrodes 6 to 12 preferably are made of copper or a copper alloy. The anode 3 is composed of an outer ring 34, made e.g. of copper or a copper alloy, and an inner ring 35, made of a material having a very good electrical and thermal conductivity and simultaneously having a very high melting temperature, e.g. thoriated tungsten.

In order to avoid that the plasma gas flow is disturbed by eventually present gaps in the wall of the plasma channel 4 in the region of the beginning of the plasma channel 4, i.e. close to the cathode assemblies 1, the neutrode 6 located closest to the cathode assemblies 1 extends over the entire zone 33 with reduced diameter. The result is that the wall 52 of the plasma channel 4 in the region of the cathode-sided end thereof is continuously shaped and smooth over the entire zone 33 with reduced diameter.

All parts which are immediately exposed to the heat of the plasma torch and of hot plasma gases are cooled by means of water. For this purpose, several water circulation channels are provided in the cathode support member 13, in the cathode part 52 and in the anode support member 14 in which cooling water KW can circulate. Particularly, the cathode support member 13 comprises three annular circulation channels 36, 37 and 38, which are connected to supply pipes 39, 40 and 41, respectively. The anode support member 14 comprises an annular circulation channel 42 located in the region of the anode 4 and an annular cooling chamber 43 located in the region of the neutrodes 6 to 12 which surrounds all the neutrodes 6 to 12. Cooling water KW is fed via the supply pipes 39 and 41. The cooling water fed by the supply pipe 39 passes a longitudinal channel 44 and is primarily directed to the annular circulation channel 42 surrounding the thermically most loaden anode 3. Therefrom, the cooling water flows through the cooling chamber 43 along the jacket surface of the neutrodes 6 to 12 back and through a longitudinal channel 45 into the annular circulation channel 37. The cooling water fed by the supply pipe 41 enters the annular circulation channel 38 and, therefrom, in a cooling chamber 46 associated to each cathode part 52; the cooling chamber 46 is subdivided by a cylindrical wall 47. From the cathode assemblies, the cooling water finally flows into the annular circulation channel 37 as well, and the entire cooling water escapes the apparatus via supply pipe 40.

Figure 3:
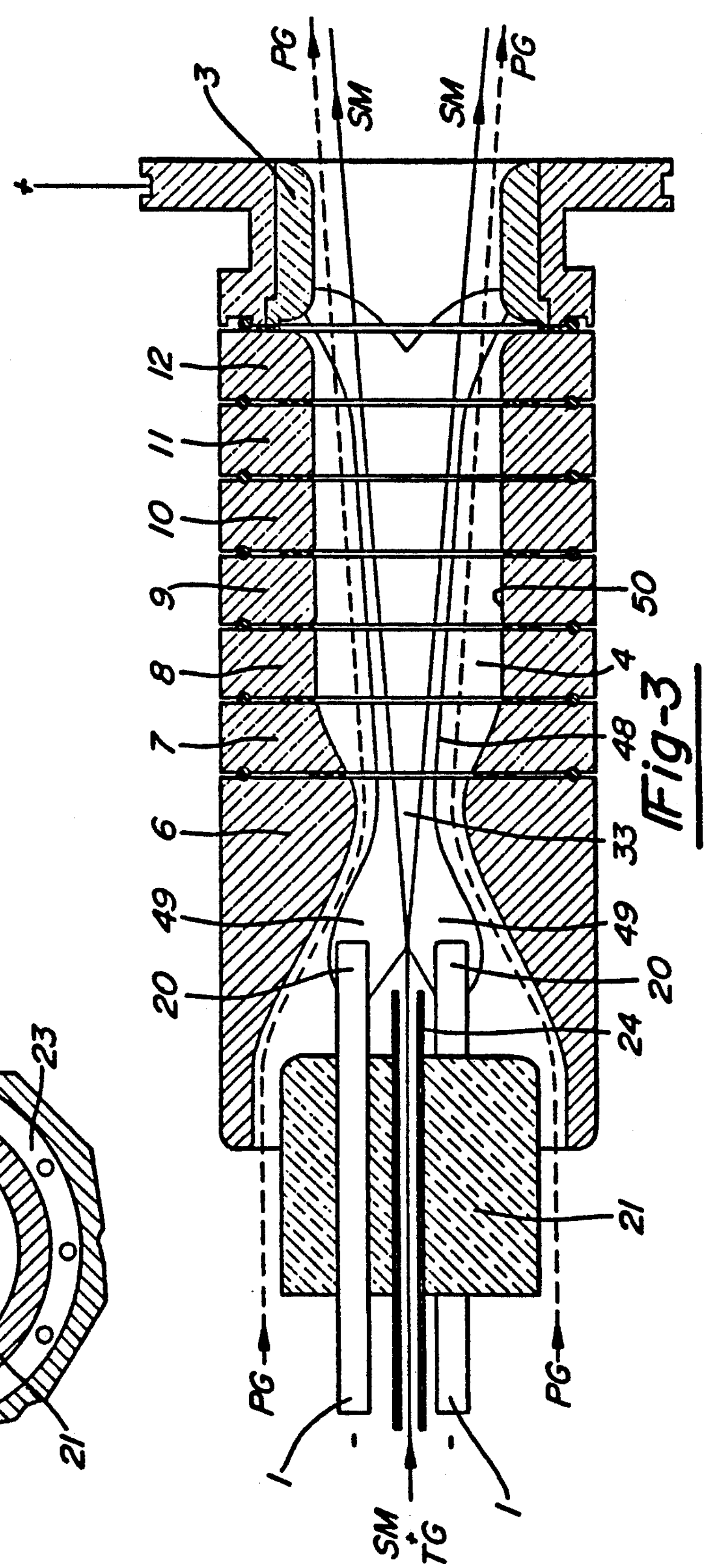
FIG. 3 a schematic sectional view of the plasma channel of the embodiment of FIG. 1 in an enlarged scale, whereby the flow the plasma gas and the powdery or gaseous material is indicated.

In FIG. 3, there are schematically shown the approximate shape of the plasma torch 48 when the apparatus according to FIGS. 1 and 2 is in operation as well as the approximate flow path of the plasma gas PG and the path of the spray material SM. The effect of the zone 33 with reduced diameter within the plasma channel 4 and the subsequent expansion thereof can be clearly seen in FIG. 3. The individual plasma torch branches 49 starting at the several cathode pins 20 are united very close to their points of origin; this effect is based on the facts that the cathode pins 20 are located very close to each other and, on the other hand, a zone 33 with a reduced diameter is present and is located near to the cathode assemblies 1. Thereby, the plasma torch and the flow lines are narrowed to such a degree that a very high energy concentration is present in the center of the plasma channel 4 even at the point where the spray material is fed into the plasma channel 4; consequently, the occurrence of a "cold" center region usually present in an apparatus according to the prior art is avoided.

In the expanded region of the plasma channel 4, following the zone 33 with reduced diameter, seen towards the anode 3, the distance between the plasma torch and the wall 50 of the plasma channel 4 is quite large. The result is that the wall 50 is exposed to less thermal load in this region and, consequently, the energy which must be removed by cooling water is reduced.

Figure 5:
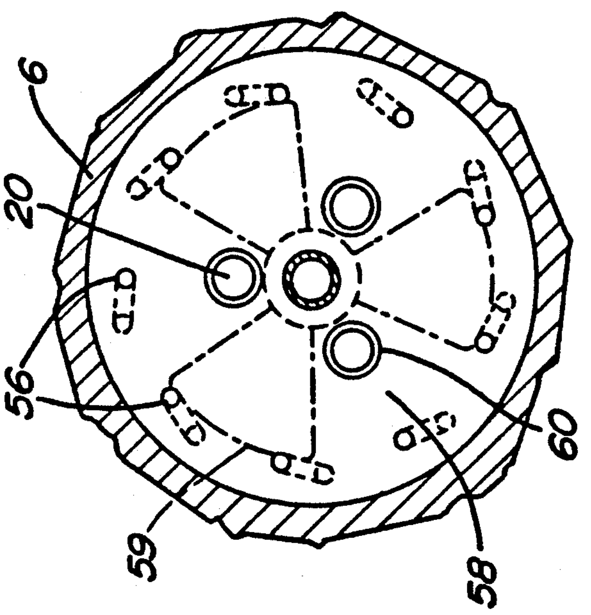
FIG. 5 shows a schematic view of the of the parts of the front region of the plasma channel according to the second embodiment in the direction X in FIG. 4.
Figure 4:
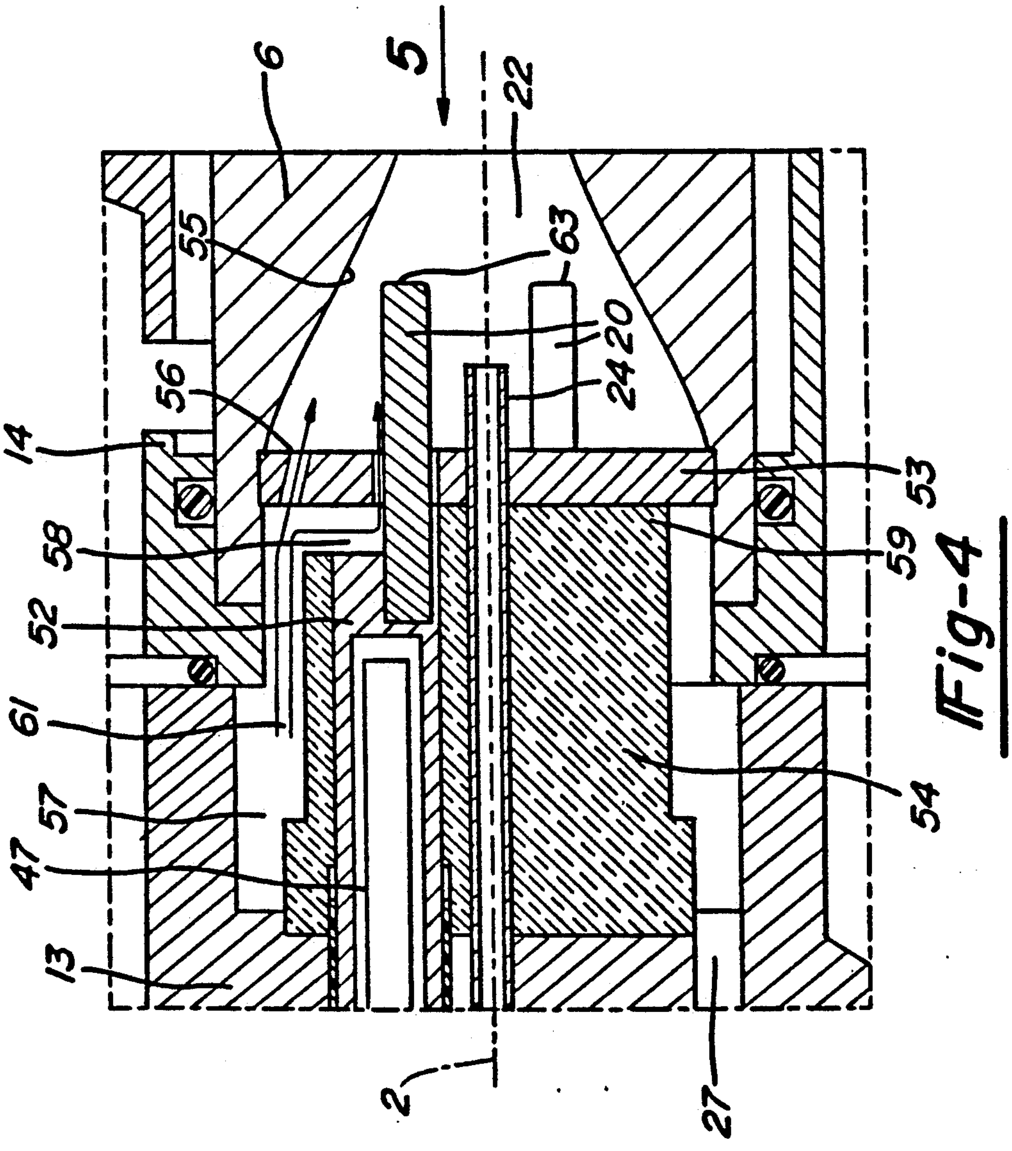
FIG. 4 shows a partial sectional view of the relevant parts of the cathode region of a second embodiment of the apparatus of the invention.

In FIGS. 4 and 5, there is shown a second embodiment of the apparatus of the invention. In these figures, only the relevant parts in the region of the cathode assemblies is shown in a partial sectional view. Besides the differences which will be explained hereinafter, the design and construction of the apparatus can be the same as described with reference to FIGS. 1 to 3. Furthermore, the same reference numerals are used for corresponding parts.

The difference between the first embodiment according to FIG. 1 and the second embodiment according to FIGS. 4 and 5 lies in the fact that the gas distribution ring 29 shown in FIG. 1 is replaced by a gas distribution disc 53. The gas distribution disc 53 is arranged in front of the central insulating member 54 and extends radially from the central tube 24 for the supply of the coating material up to the wall 55 of the inlet nozzle constituted by the first neutrode 6. This gas distribution disc 53 is provided with a plurality of continuous bores 56 located along the periphery of a circle which serve to enable the plasma to pass from the annular channel 57 to the hollow nozzle chamber 22 defined by the interior of the first neutrode 6. As can be schematically seen from FIG. 5, the bores 56 are somewhat inclined in tangential direction with the result that the plasma gas flows in a whirl around the central longitudinal axis 2 into the hollow nozzle chamber 22. It is understood that the same measure can be taken in connection with the gas distribution ring 29 according to FIG. 1.

The front surface of the insulating member 54 which faces the gas distribution disc 53 comprises a number of sector-shaped recesses so that in these regions sector-shaped hollow chambers 58 are formed which are delimited by those parts 59 of the insulating member 54 which rest against the adjacent front surface of the gas distribution disc (shown in dash-dot lines in FIG. 5). The apertures 60 in the gas distribution disc 53 through which the cathode pins 20 extend have a somewhat greater diameter than the outer diameter of the cathode pins 20. Thereby, an annular gap between the aperture 60 and the surface of the cathode pin is formed; due to the provisions of the sector-shaped chambers 58, a part of the plasma gas flows through this gap from the annular chamber 57 immediately along the cathode pins 20 into the hollow nozzle chamber 22. The flow of the gas is shown in FIG. 4 by the arrows 61.

Figure 7:
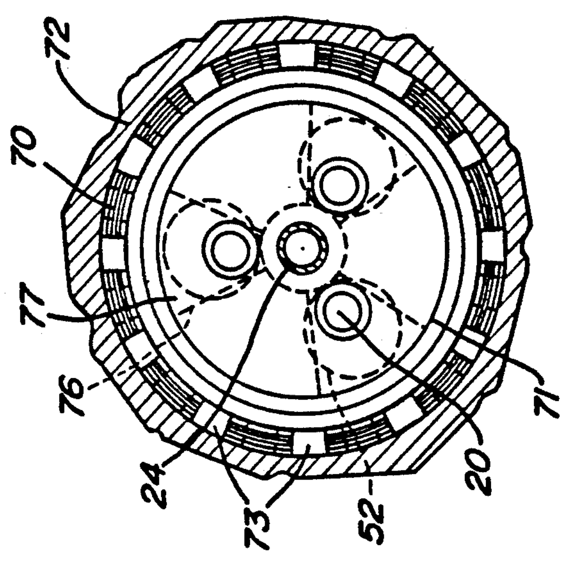
FIG. 7 shows a schematic view of the of the parts of the front region of the plasma channel according to the third embodiment in the direction X in FIG. 6.
Figure 8:
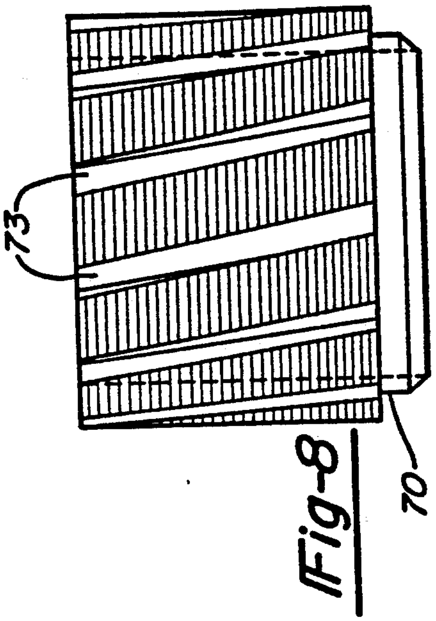
FIG. 8 a side view of a gas guiding sleeve used in the embodiments according to FIGS. 6 and 7.
Figure 6:
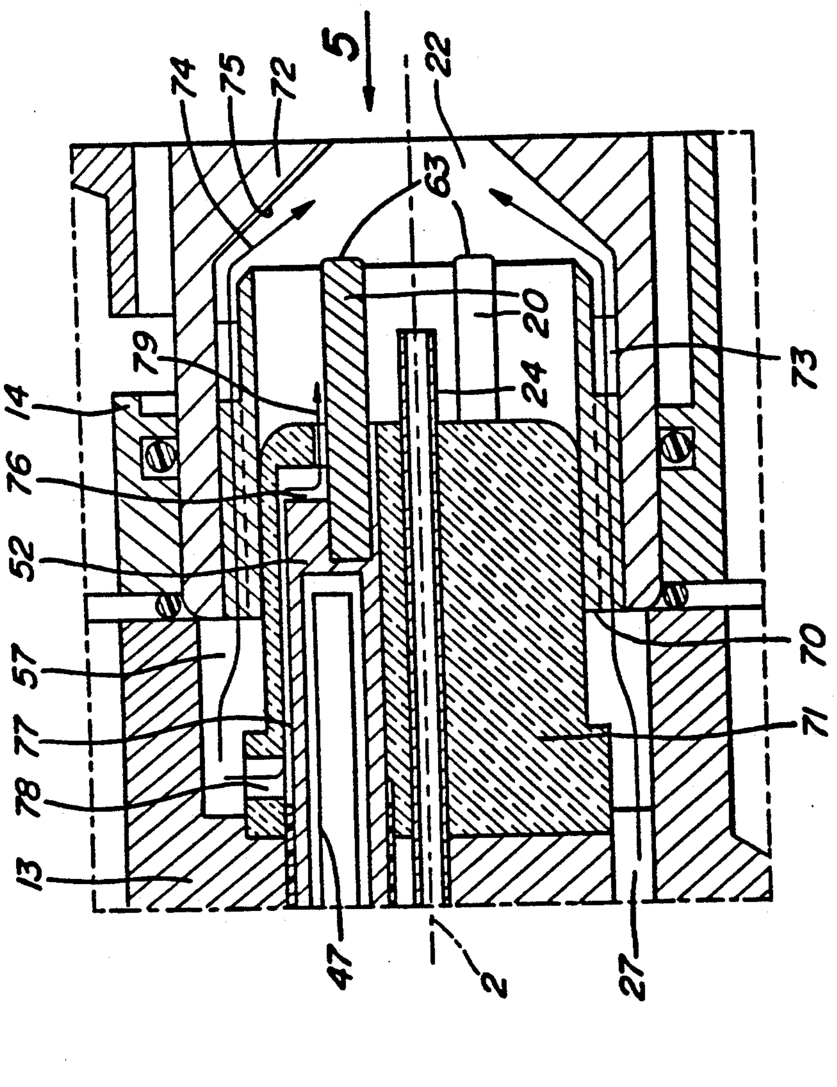
FIG. 6 shows a partial sectional view of the relevant parts of the cathode region of a third embodiment of the apparatus of the invention.

The FIGS. 6 to 8 show a further embodiment of the apparatus of the invention whereby FIG. 6 corresponds to the view shown in FIG. 4, FIG. 7 corresponds to the view shown in FIG. 5 and FIG. 8 shows a side view of a gas guiding sleeve used in the embodiments according to FIGS. 6 and 7. Parts and elements in FIGS. 6 to 8 corresponding to parts and elements of FIGS. 4 and 5 have the same reference numerals.

The difference between the first embodiment according to FIG. 1 and the second embodiment according to FIGS. 4 and 5 on the one hand and the third embodiment according to FIGS. 6 to 8 lies in the fact that the gas distribution ring 29 shown in FIG. 1 and the gas distribution disc 53 shown in FIG. 4, respectively, is replaced by a gas distribution sleeve 70 made e.g. of copper. The gas distribution sleeve 70 is located in the annular room between the central insulating member 71 and the first neutrode 72 located closest to the anode assembly. The gas distribution sleeve 70 is provided with continuous longitudinal grooves 73 provided on its outer surface which serve for the passage of the plasma gas. As can be clearly seen from FIG. 8, the longitudinal grooves 73 have helicoidal shape with the result that the plasma gas flowing from the annular channel 57 in the direction of arrow 74 into the longitudinal grooves 73 leave the gas distribution sleeve 70 in a whirled state. In order to achieve that this whirled flow is maintained up to the point where the plasma torch is created, the gas distribution sleeve 70 has a longitudinal dimension such that it reaches a region close to the zone with reduced diameter, i.e. close to the wall 75 of the neutrode 72.

In this embodiment, at the front surface of the cathode shaft parts 52, sector-shaped hollow chambers 76 are provided in the insulating element 71 as well from which a part of the plasma gas flows along the cathode pins 20 into the hollow nozzle chamber 22 to cool the cathode pins 20. The plasma gas enters these sector-shaped hollow chambers 76 through related longitudinal gaps 77. The longitudinal gaps 77 are connected to the annular channel 57 via radially extending inlet channels 78 provided in the insulating member 71. The path of the gas flow is shown by the arrow 79.

What is claimed is:

1. A plasma spray apparatus for spraying powdery or gaseous material, comprising:

an plasmatron adapted to create an elongated plasma torch;

means for axially feeding said powdery or gaseous material into said plasma torch;

said plasmatron comprising a cathode assembly, an annular anode member located distantly from said cathode assembly and a plasma channel extending from said cathode assembly to said anode member;

said plasma channel being delimited by said annular anode member as well as by a plurality of annular neutrode members which are electrically insulated from each other;

said plasma channel having a zone with a reduced diameter located in that region of said plasma torch which is near to said cathode assembly and thereby forming a plasma channel inlet nozzle;

said cathode assembly comprising a central electrically insulating member arranged in a fixed position with regard to said plasma channel inlet nozzle and further comprising a plurality of cathode elements embedded in said insulating member, said cathode elements being located and evenly distributed along the periphery of a circle around a central axis of the apparatus;

each of said cathode elements comprising a cathode pin having an active end on which the plasma torch is created and which extends out of said insulating member into said plasma channel inlet nozzle; and said means for axially feeding said powdery or gaseous material into said plasma torch comprising a supply tube for the supply of powdery or gaseous spray material into said plasma channel inlet nozzle, said supply tube being located coaxially to said central axis of the apparatus and being fixed in said central insulating member.

2. A plasma spray apparatus according to claim 1 in which said cathode pins of said cathode elements and said supply tube each extend into the plasma channel wherein, said cathode pins are positioned closer to said anode then is said supply tube.

3. A plasma spray apparatus according to claim 1 in which said central insulating member is made of a material having a high melting temperature.

4. A plasma spray apparatus according to claim 3 in which said central insulating member is made of ceramics material.

5. A plasma spray apparatus according to claim 1 in which said central insulating member comprises apertures surrounding said cathode pins which have a greater diameter than said cathode pins in order to provide for the passage of plasma gas which flows from said cathode assembly to said anode member.

6. A plasma spray apparatus according to claim 1 in which each of said cathode elements include a water-cooled cathode shaft member and a cathode pin fixed to the end portion of said cathode shaft members, said cathode pin being made of a material having a high melting temperature.

7. A plasma spray apparatus according to claim 6 in which said cathode shaft member is made of copper and said cathode pin is made of thoriated tungsten.

8. A plasma spray apparatus according to claim 6 in which each of said cathode pin is eccentrically fixed to its associated cathode shaft such that the longitudinal axes of the cathode pins are closer to the central axis of the apparatus than the longitudinal axes of the cathode shafts.

9. A plasma spray apparatus according to claim 1 in which the jacket surface of said central insulating member is located in radially faced relationship with respect to a part of the wall of said plasma channel inlet nozzle such that the outer surface of said central insulating member and said inner wall of said plasma channel inlet nozzle define an annular channel serving for the inlet of the plasma gas into said plasma channel inlet nozzle.

10. A plasma spray apparatus according to claim 1 in which there is provided a plasma gas distribution means comprising a plurality of nozzle means for achieving a laminar flow of the plasma gas into said plasma channel inlet nozzle.

11. A plasma spray apparatus according to claim 1 in which said gas distribution means comprises an annular distribution disc mounted on said central insulating member having a plurality of continuous apertures for the passage of plasma gas through said annular channel between said jacket surface of said central insulating member and said part of the wall of said plasma channel inlet nozzle.

12. A plasma spray apparatus according to claim 1 in which said gas distribution means comprises an annular distribution disc mounted in front of said central insulating member, said gas distribution disc extending radially from said supply tube for the supply of coating material up to the wall of said plasma channel inlet nozzle and comprising a plurality of continuous apertures for the passage of plasma gas into said plasma channel inlet nozzle, said apertures being arranged and evenly distributed along the periphery of a circle coaxial with the central longitudinal axis of the apparatus.

13. A plasma spray apparatus according to claim 12 in which said annular distribution disc is made of a material having a high melting temperature.

14. A plasma spray apparatus according to claim 12 in which said annular distributing disc is made of ceramics material or boron nitride.

15. A plasma spray apparatus according to claim 12 in which the central axis of said continuous apertures for the passage of plasma gas into said plasma channel inlet nozzle extend tangentially with regard to virtual helical lines which are symmetric to the central axis of the apparatus.

16. A plasma spray apparatus according to claim 11 in which said annular distribution disc mounted on said central insulating member comprises further apertures through which the said cathode pins extend and which have a greater diameter than said cathode pins.

17. A plasma spray apparatus according to claims 1 in which said gas distribution means comprises a gas distribution sleeve inserted between the annular chamber between the central insulating member and the wall of the first neutrode member located closest to the cathode assembly, said gas distribution sleeve comprising, on its outer surface, continuous longitudinal grooves for the passage of the plasma gas.

18. A plasma spray apparatus according to claim 17 in which said longitudinal grooves have helicoidal shape.

19. A plasma spray apparatus according to claim 17 in which said gas distribution sleeve extends close to the wall of the first neutrode located closest to said cathode assembly.

20. A plasma spray apparatus according to claim 1 in which said plasma channel continuously expands in its cross section after said plasma channel inlet nozzle towards said anode member.

21. A plasma spray apparatus according to claim 3 in which said central insulating member is made of boron nitride.

* * * * *

UNITED STATES PATENT AND TRADEMARK OFFICE

CERTIFICATE OF CORRECTION

PATENT NO. : 5,332,885

DATED : July 26, 1994

INVENTOR(S) : Klaus Landes

It is certified that error appears in the above-indentified patent and that said Letters Patent is hereby corrected as shown below:

On the title page, item [73]:

Assignee: PLASMA-TECHNIK AG
a corporation of Switzerland
Rigackerstrasse 21
CH-5610 Wohlen 1, Switzerland Signed and Sealed this Twenty-ninth Day of November, 1994

Attest:

Bruce Lehman

BRUCE LEHMAN

*Attesting Officer* *Commissioner of Patents and Trademarks*